June 16, 1942.  J. TODD  2,286,982
LOCKING NUT
Filed June 25, 1940
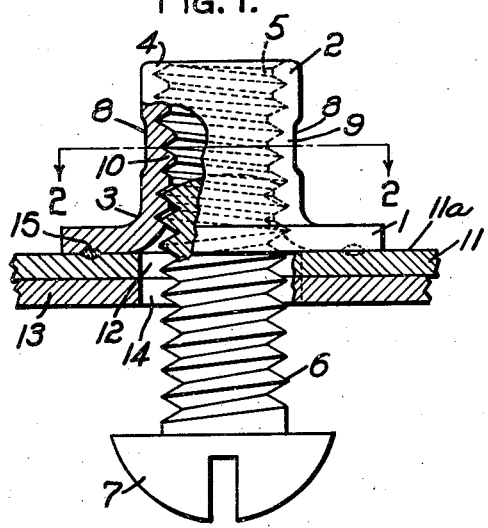
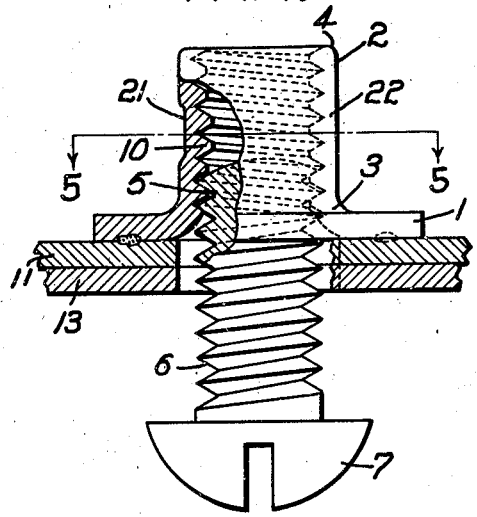
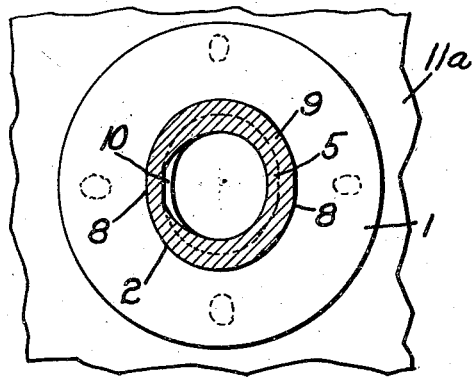
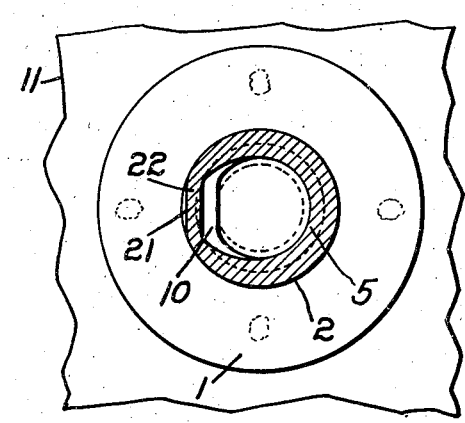
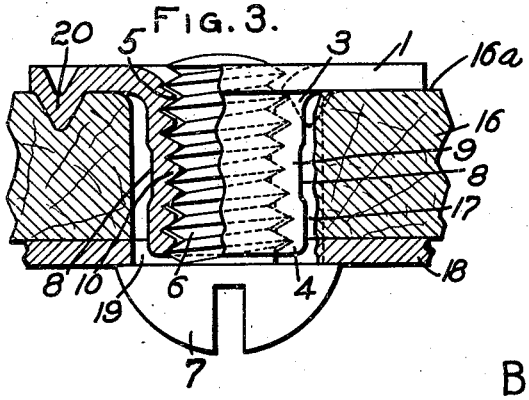
INVENTOR:
JOHN TODD,
By Walter S. Jones ATT'Y.

Patented June 16, 1942

2,286,982

UNITED STATES PATENT OFFICE 2,286,982

LOCKING NUT

John Todd, Lincoln, Mass., assignor to United-Carr Fastener Corporation, Cambridge, Mass., a corporation of Massachusetts Application June 25, 1940, Serial No. 342,232

3 Claims. (Cl. 151—21)

This invention relates to improvements in lock nuts.

An object of my invention is the provision of a lock nut providing a body having a bore extending from end to end and a cylindrical thread adjacent to the inner face of the bore and extending the length of the bore. The nut member is constructed to provide a locking means intermediate its ends for engaging a cooperating threaded member to effect a shakeproof engagement, but formed in a way to leave the thread adjacent ends of the body of normal diameter and pitch so that a threaded member may be entered at either end of the body.

This invention is particularly useful in connection with nut members of the type providing a base and a thin walled shank or barrel drawn from the material of the base as the nut member may be applied to an apertured support in either one of two positions, as hereinbelow described, to enable a threaded member to be entered freely into either end of the shank. The locking or binding action is preferably provided by displacing the internal shank threads inwardly intermediate the ends of the shank and operates to bind the threaded member no matter from which end the threaded member is entered.

Other objects and uses of my invention will be apparent from inspection of the drawing and specification hereinbelow set forth.

Referring to the drawing, in which I have illustrated preferred embodiments of my invention:

Fig. 1 is a plan view partly in section of a nut installation showing my first form of lock nut secured in one position relative to a supporting panel with a threaded member entering engagement therewith;

Fig. 2 is a section taken along the line 2—2 of Fig. 1;

Fig. 3 is a plan view partly in section showing my first form of lock nut disposed in another position relative to a support with a threaded member engaged with the nut to secure a panel to the support;

Fig. 4 is a view similar to Fig. 1 and showing my second form of lock nut; and

Fig. 5 is a section taken along the line 5—5 of Fig. 4.

Referring to my first form of nut member illustrated in Figs. 1-3, I have shown a nut member which is preferably formed of a single piece of sheet metal material. The nut member has a base portion 1 and a shank or barrel 2 extending in perpendicular relation to the base formed from material of the base by a drawing operation. The shank 2 is initially cylindrical in shape providing an internal bore extending from its end 3 adjacent the base 1 to its outermost end 4. A cylindrical thread 5 is provided internally of the shank 2 and extends from the end 3 to the end 4. The thread 5 is adapted to cooperate with a thread on the shank 6 of an attaching screw 7.

In providing the locking feature in my first form of lock nut, opposed sides of the shank 2 are pressed inwardly or flattened as at 8—8 so as to provide an oval-shaped locking portion 9. The locking portion 9 is of sufficient length to have substantially two full thread turns which are displaced inwardly by the flattening action so that the root diameter of the bore of the non-circular portion 9 through the flattened sides 8—8 is less than the major diameter of the threaded shank 6. Portions of the shank adjacent the ends 3 and 4 have at least one full thread of normal diameter and pitch to engage regularly the threaded shank 6. Thus, as a result, the threaded shank 6 may be entered at either the end 3 or 4 of the shank to engage normally at least one full turn of the thread 5. When the screw thread comes into engagement with the inwardly displaced thread turns of the non-circular portion 9, the non-circular portion must yield tending to assume its normal circular shape. As soon as the screwing action is terminated, the flattened sides 8—8 of the locking portion tend to contract or resume their normal shape thereby causing at least one inwardly displaced thread turn 10 to bind the screw, as shown most clearly in Fig. 3.

The importance of this novel construction of the nut member, wherein a screw may be entered at either end of a threaded bore, may be seen from inspection of the installation shown in Figs. 1 and 3. Thus in Fig. 1 I have shown a combination of parts comprising a metal supporting panel 11 having a screw-receiving aperture 12 and a part 13 to be secured to the panel 11 having an aperture 14 in alignment with the aperture 12. The nut member is applied to the support 11 with its base 1 spot-welded to the outer surface 11ª of the support as at 15 and its shank 2 in alignment with the apertures 12 and 14 and extending away from the part 13. In this relative position of the parts the threaded member 7 first engages the thread 5 adjacent the end 3 of the shank. On the other hand, in Fig. 3 I have shown a slightly different installation providing a support 16 which may be of wood having an aperture 17 which is larger in diameter than the shank 2 of the nut member and a part 18 to be secured to the support 16 having an aperture 19 in alignment with the aperture 17. The nut member may be applied to an installation of this sort with its base 1 adjacent the outer surface 16ª of the support 16 and its shank 2 extending into the openings 17 and 19 of the parts 16 and 18. The base 1 may have an embossment 20 embedded in the support 16 to prevent rotation of the nut during engagement of the screw member therewith. It will be seen that in this type of installation the screw member is entered into engagement with the thread 5 adjacent the end 4 of the shank.

As a result of my invention a normal thread is provided at either end of the shank permitting the nut member to be applied to a support by either of the methods shown in Figs. 1 and 3 and the locking means operates equally efficiently to bind the screw member no matter from which end the screw is entered. The locking means is capable of preventing rotation of the parts even when subjected to abnormal jar or vibration and therefore is particularly adaptable to use in connection with automobile and airplane manufacture. The nut member effects a firm binding engagement even after repeated entrance and withdrawal of a screw member and repeated engagement and disengagement does no appreciable damage to the thread of either the screw or nut member.

A modified form of nut member is illustrated in Figs. 4 and 5. This nut member differs from my first form in that instead of flattening two sides of the shank, as at 8—8 of my first form, one side 21 only is flattened to provide a non-circular locking portion 22. The side 21 is yieldable on engagement of the inwardly displaced thread portion with the screw shank and is contractible to bind the screw shank. The locking portion 22 of my second form, which is intermediate the ends of the shank, is slightly less resilient than the oval-shaped locking portion 9 of my first form but operates efficiently to effect a satisfactory binding engagement with the screw shank.

Although I have illustrated and described preferred embodiments of my invention, I do not wish to be limited thereby because the scope of my invention is best defined by the following claims.

I claim:

1. A shakeproof nut member providing a body, a cylindrical thread formed internally of said body extending from end to end thereof, said body having a portion of non-circular cross-sectional shape intermediate its ends, said body having a root diameter through said non-circular portion which is less than the major diameter of a cooperating threaded member whereby said non-circular portion is expansible by said threaded member toward normal shape and contractible to bind said threaded member, and said nut thread being of normal diameter and pitch adjacent said ends of said body whereby said threaded member may enter regular engagement with said thread at either end of said body.

2. A shakeproof nut member having a base, a hollow shank extending from said base, a cylindrical thread formed internally of said shank extending from adjacent said base to the outer end of said shank, a portion of said thread being displaced inwardly intermediate said base and the outer end of said shank for binding engagement with a cooperating threaded member and said thread being of normal diameter and pitch adjacent said base and said outer end of said shank whereby said threaded member may engage said thread regularly at either end thereof.

3. A shakeproof nut member having a base, a hollow thin walled shank drawn from the metal of said base, a cylindrical thread formed internally of said shank extending from adjacent said base to the outer end of said shank, said shank having a portion of non-circular cross-sectional shape intermediate its ends, said shank having a root diameter through said non-circular portion which is less than the major diameter of a cooperating threaded member whereby said non-circular portion is expansible by said threaded member toward normal shape and contractible to bind said threaded member, and said thread being of normal diameter and pitch adjacent said ends of said shank whereby said threaded member may enter regular engagement with said thread at either end of said shank.

JOHN TODD.